W. E. CLIFFORD AND T. H. GREEN.
SULFUR RETORT.
APPLICATION FILED JAN. 25, 1919.
1,332,542.
Patented Mar. 2, 1920.
3 SHEETS—SHEET 1.
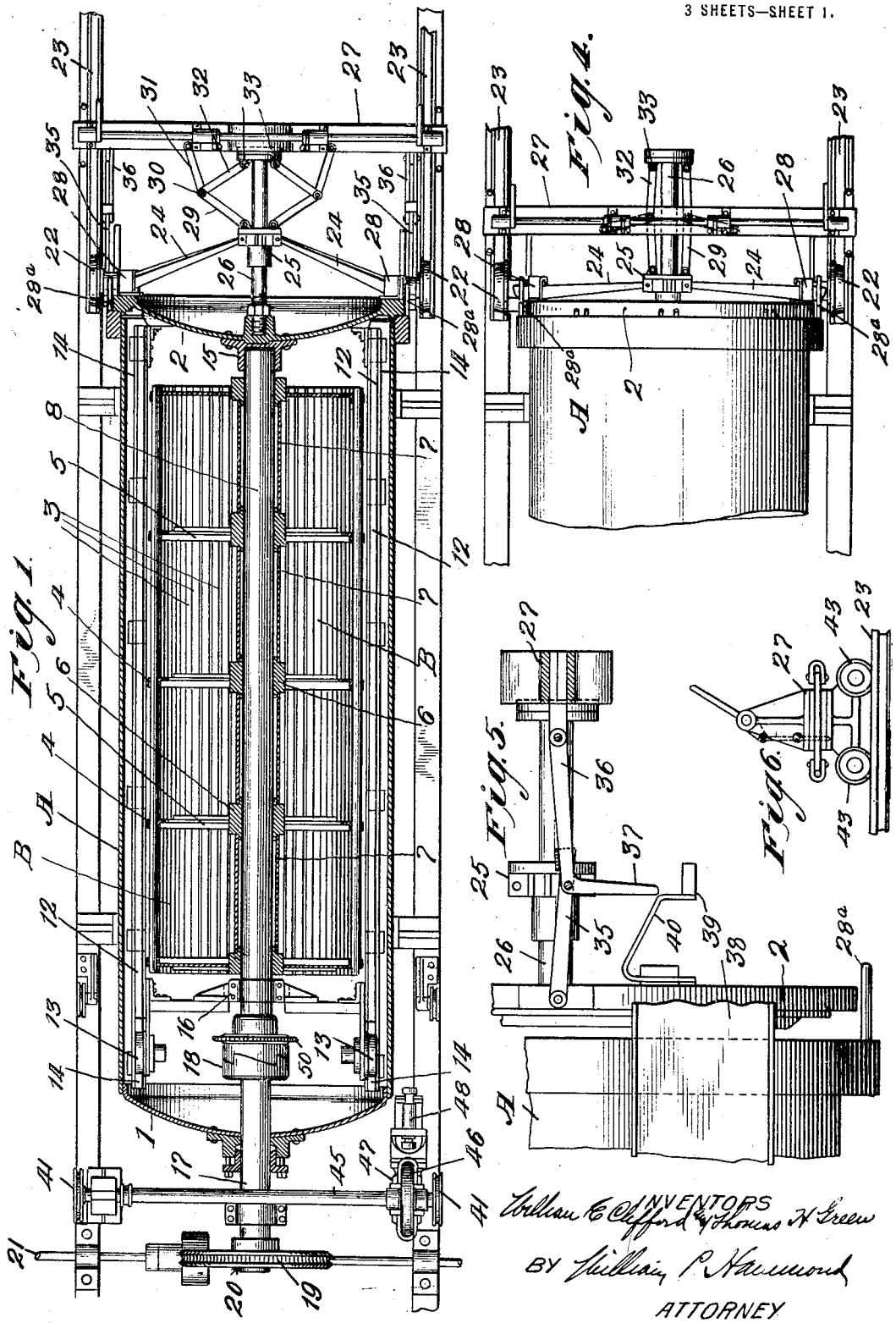

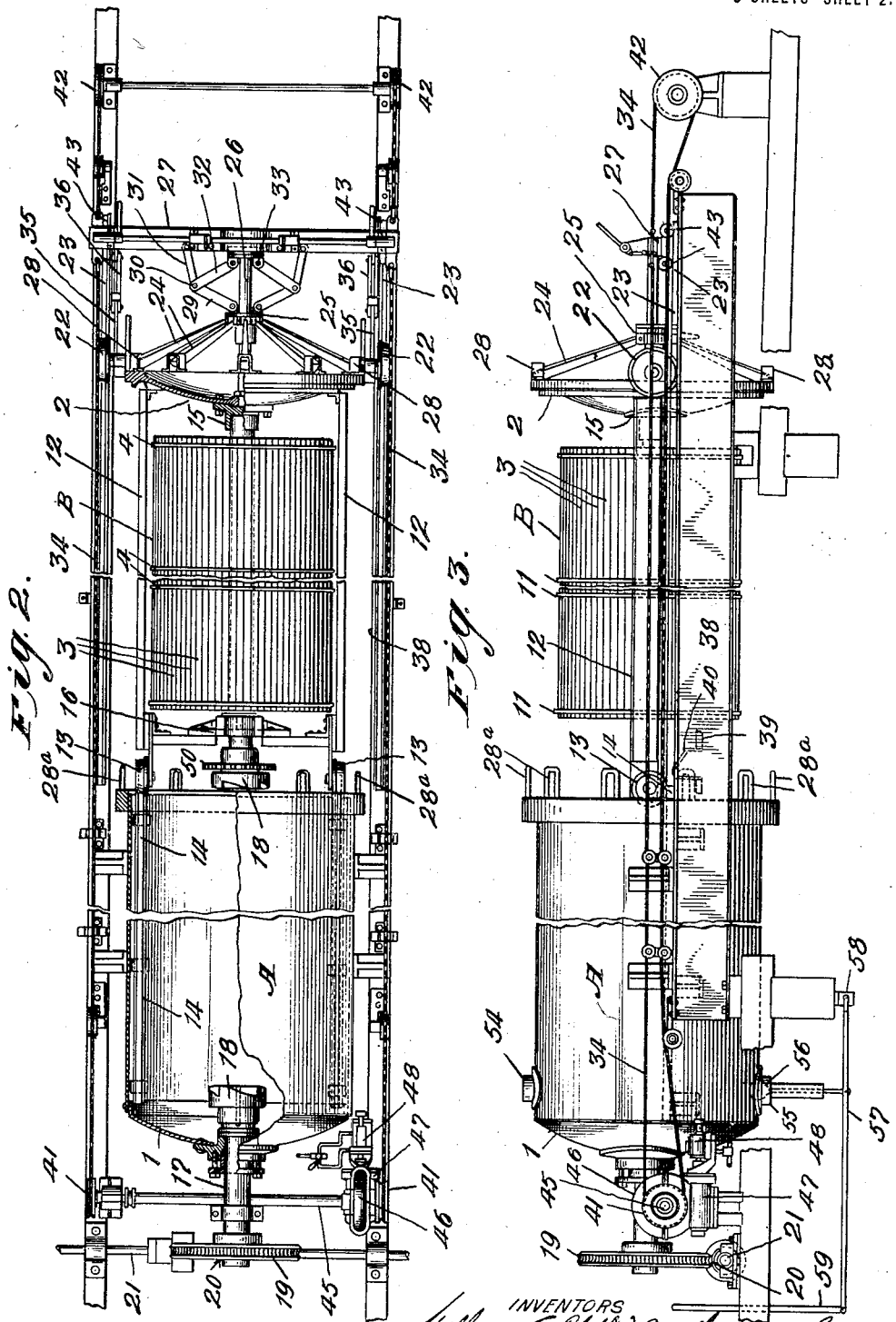

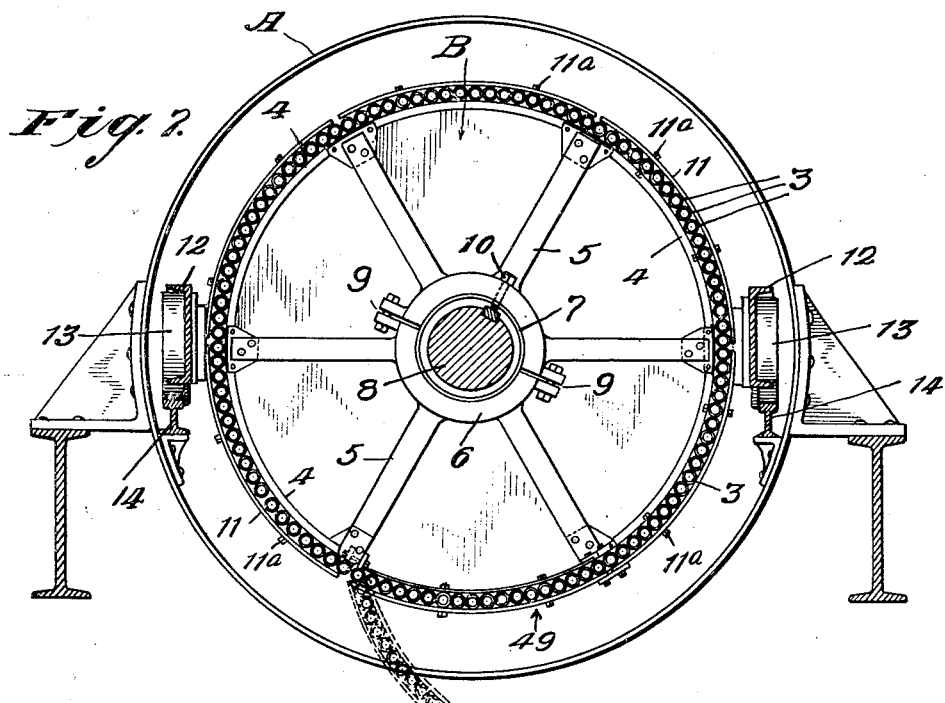
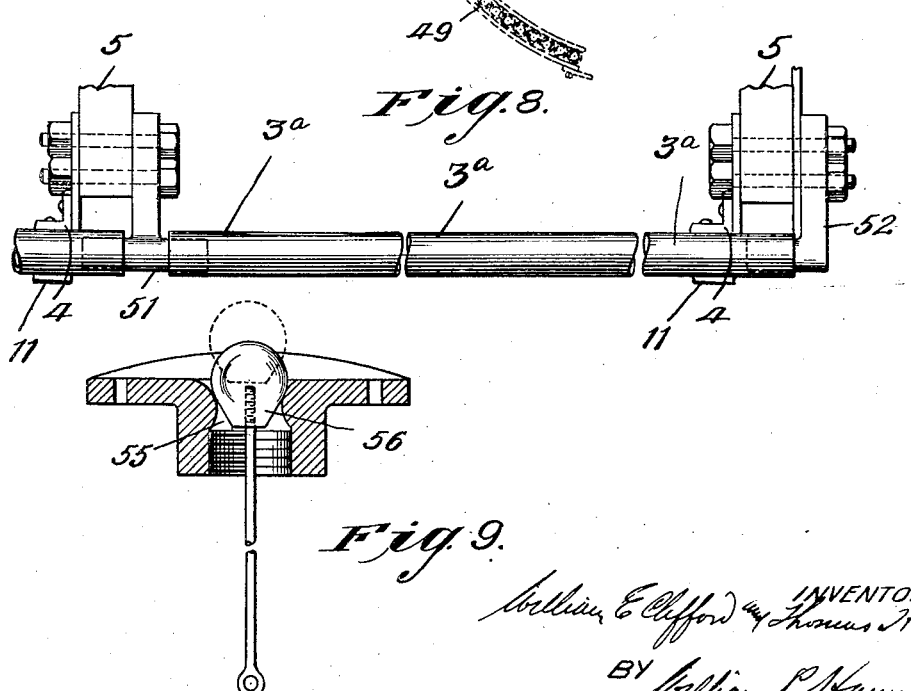

UNITED STATES PATENT OFFICE.

WILLIAM E. CLIFFORD, OF SALT LAKE CITY, UTAH, AND THOMAS H. GREEN, OF SPRINGFIELD, ILLINOIS, ASSIGNORS TO UNITED FILTERS CORPORATION, OF NEW YORK, N. Y., A CORPORATION OF DELAWARE.

SULFUR-RETORT.

1,332,542. Specification of Letters Patent. Patented Mar. 2, 1920.

Application filed January 25, 1919. Serial No. 273,029.

*To all whom it may concern:*

Be it known that we, WILLIAM E. CLIFFORD, a citizen of the United States, residing in Salt Lake City, county of Salt Lake, and State of Utah, and THOMAS H. GREEN, a citizen of the United States, residing in Springfield, Sangamon county, and State of Illinois, have invented certain new and useful Improvements in Sulfur-Retorts, of which the following is a specification.

Our invention relates to an apparatus for extracting sulfur from sulfur-bearing material by fusion and has for its object the provision of means whereby this may be accomplished in an efficient and expeditious manner.

Our invention in its broadest aspects comprehends the utilization of a cage-like receiver for the stratified sulfur bearing rock or other material and a housing or casing arranged to accommodate the cage in such a way that the cage while being rotatably mounted when functioning therein may be readily removed endwise therefrom into filling or discharging position as the case may be, the casing also being provided with a steam inlet and a valve controlled discharge orifice for the molten sulfur.

In the accompanying drawings we have illustrated by way of example a preferable embodiment of the principles of our invention in which;—

Figure 1 is a horizontal sectional view of a retort showing the parts in operative position, just prior to the final operation of the head locking mechanism.

Fig. 2 is a top plan view of the apparatus showing the parts in inoperative position and with the cage removed from the casing.

Fig. 3 is a view in side elevation with the parts in operative position.

Fig. 4 is a top plan view of a detail illustrative of the position assumed by the head locking mechanism after functioning.

Fig. 5 is an enlarged fragmentary detail of the mechanism employed for tripping the head-locking linkage prior to assuming the position shown in Fig. 4.

Fig. 6 is a detail illustrative of the manner in which the head-locking mechanism is retained in its locking position.

Fig. 7 is a view in vertical cross section of the apparatus shown in Fig. 1, illustrating the manner in which the cage may be provided with a movable door or section for filling or dumping purposes.

Fig. 8 is a fragmentary detail on an enlarged scale of the hinge mechanism employed for hingedly mounting the movable section of the cage.

Fig. 9 is a view partly in cross section of the valve-controlled discharge port or passage provided in the tank for the molten sulfur.

Referring to the illustrated embodiment of the invention in detail, A indicates a cylindrical shell or casing permanently closed at one end by a head 1 and by a movable closure or head 2 at the other end. Slidably and rotatably mounted within the shell A is a cage B in which the stratified sulfur rock or material is lodged during the operation of the apparatus. The cage is preferably made of cast iron as this has been found best to resist the decomposition that occurs in handling molten sulfur and at the same time it possesses the required strength to receive and support the sulfur rock. Of course, other suitable material possessing the necessary properties to resist such decomposition and having the required strength to support the weight of this material may be employed, if desired. The cage is formed of a series of rods or pipes 3 arranged in the shape of a drum. The pipes 3 are supported on ring-like supports 4, which are in turn fastened to spiders 5 consisting of a series of arms radiating from a split collar 6, these being several in number and disposed equi-distant along the length of the cage to lend it the proper strength and rigidity. It will be understood that the pipes 3 are quite closely aggregated, only sufficient tolerance or clearance being allowed to permit of the molten sulfur to escape and flow into the outer casing from which it is drawn off when desired. The split collars 6 surround and are fastened to the main center driving shaft 8 and separating the split collars are sleeves 7. The sections of the split collar 6 are bolted together by the fastening means 9 and in order to form a rigid connection between the cage and shaft 8 so that the two will rotate in unison, a bolt 10 penetrating the collar 9 having connection through a suitable key way with the shaft 8 is employed for the purpose.

To hold the tubes 3 upon the supporting ring 4, members 11 and penetrating bolts 11ª are employed. The cage is mounted in a traveling frame 12 carrying suitable wheels 13 which traverse a pair of rails 14 within the casing. The carriage 12 is supported at one end upon the removable closure 2 as is also the shaft 8—the latter by a suitable bearing 15. The forward end of this shaft is supported in a bearing 16 provided in an upwardly extending portion of the frame 12. Thus, the carriage is connected with or made a part as it were of the removable closure of the tank constituting substantially a unitary structure as both parts are designed to be positioned and removed relatively to the tank in unison.

The driving mechanism employed for rotating the cage comprises a driving shaft 17 journaled in the permanent head of the shell or casing A. This shaft is coöperatively associated with the shaft 8 through the medium of a clutch 18. Upon the extended portion of the shaft is mounted a worm wheel 19 in engagement with a worm 20 mounted upon a shaft 21, having imparted thereto driving power from a suitable source (not shown). Through the medium of the clutch 18, it will be apparent that the shaft 8 supporting the clutch may be readily disconnected from the driving means, enabling the cage to be withdrawn for filling or emptying as the case may be.

As before explained, the cage carrying carriage and movably mounted closure for the tank are connected in such a way as to move together, the inner portion of the carriage being supported upon suitable tracks within the tank or casing. The head or closure 2 is also provided with a suitable truck having wheels 22 operating on parallel track irons 23 exteriorly arranged with respect to the tank, thus completing the essential instumentalities to make the cage easily mobile.

In order to provide for a complete, positive closure, the movable head 2 is provided with a quick-acting locking mechanism upon the functioning of which a positive tight joint between the open end of the tank and the head is effectuated. This automatic locking mechanism comprises an arrangement of toggle levers, said mechanism comprising a plurality of radially disposed levers 24 operably connected with a collar 25 slidably mounted upon a shaft 26, one end of which is fastened to the movable head 2, while the opposite end is coöperatively associated with a cross bar 27. The levers 24 pivotally mounted to the collar 25 have their free ends curved or cam-shaped and slidably operating between suitable lugs 28 projecting from the front face near the periphery of the movable closure 2. These curved ends interlock with suitable lugs or ears 28ª projecting from the front face near the periphery of the casing. Connected with the collar by their rear ends are links 29, having their forward ends in turn pivoted at 30 to rear ends of similar links 31 and 32. The front ends of the links 31 are pivoted to the movable cross bar 27 and the front ends of the links 32 are pivoted to the collar 33 fast upon the shaft 26. From this it will be understood that the linkage arrangement comprising links 31 and 32 constitute a toggle connection operably associated with and actuated by the cross bar 27. The outer ends of the cross bar are connected to suitable transmission chains 34, through which the operating power is transmitted and applied to effect the movement of the cage from operative to inoperative positions, as well as the head locking mechanism.

The ends of the cross bar 27 are connected to the movable head 2 by means of links 35 and 36, the link 36 having a depending arm 37. Fixed to the tank supporting beams 38, which extend on each side of the apparatus, is a tripping device 39 having an inclined or cam surface 40 so positioned as to engage the outer end of the arm 37 of the lever 36, so that when the latter is passing over the incline 40, it will actuate the links 35 and 36 and throw them out past their dead center position. The means employed for actuating the cross bar 27 and the toggle locking mechanism comprises the transmission cables 34. These cables are arranged on both sides of the apparatus and pass over pulleys 41 and 42 at opposite ends of the beams supporting the entire apparatus, said cables being fastened to the cross bar 27. This cross bar as will be observed is also made readily mobile by means of the wheels 43 traveling upon suitable rails 23. The pulleys 41 are mounted upon a shaft 45, and upon this shaft and within a suitable housing 46 is a worm wheel which is in driving connection with the worm contained in the housing 47, the latter worm being mounted upon a shaft directly driven by a suitable air motor 48.

It will be apparent from the foregoing that when the cage is completely housed within the shell and the removable closure in locked position against the end of the cage, the levers and toggle and associated actuating mechanism will appear as in the full line position of Fig. 4. When it is desired to remove the cage from its inclosing casing, the motor by means of associated cables will pull the movable cross bar 27 outwardly from the tank or casing unfolding or expanding the links and toggle into the position shown in Fig. 1. As this operation continues, the removable closure 2 with the cage will separate from the casing A, the clutch 18 permitting the disengagement from the driving shaft 17 until the parts finally assume the position shown in Figs. 2 and 3, in which position the cage is ready to be either filled or dumped as occasion may require. The cage may be provided with one or more hingedly arranged door sections 49, by means of which the cage may be filled or emptied of the sulfur bearing material. In order to rotate the carriage when it is withdrawn from the shell to either position, a sprocket 50 is provided upon the shaft 8 to acommodate a suitable chain connected with a suitable source of power, thus enabling the rotation of the cage to present the doors in the desired position. One suitable arrangement for the door section is illustrated in Figs. 7 and 8, the structural details being shown enlarged. The door comprises a segment of the piped periphery of the cage and is hingedly arranged. This is accomplished by using one of the pipes indicated at 3ª as a fulcrum. Suitable short T and L pivots 51 and 52 are employed, these being fastened to a leg or arm of the spider in the manner shown.

The shell is provided with a steam inlet 54 and a valve controlled molten sulfur outlet 55. The valve 56 controlling this outlet is manually manipulated and for this purpose, the valve stem is connected with a lever 57 pivoted to a support 58 at one end, and at the other end is provided with upstanding hand-bar 59. Upon lifting the bar, the valve is unseated, thus allowing the molten sulfur to flow through the discharge orifice to the collecting point.

In the operation of the device, the sulfur bearing material is placed within the cage whereupon the cage is slid within the casing, the cover being securely locked. Steam is then admitted through the port 54, and power is applied to shafts 17 and 18, to rotate the cage at a slow rate of speed for the required length of time to melt the sulfur. When the fusing period is completed, the valve 56 is opened and the sulfur withdrawn whereupon the driving power employed to rotate the cage is cut off and the cage is withdrawn from the shell, to permit of its emptying and replenishment.

While we have illustrated one embodiment of the principles of the invention, we have done so by way of example, wishing it to be understood that we do not limit ourselves to the precise structural details illustrated and described but, on the contrary, we desire to secure unto ourselves those principles in whatever manner it may be found desirable to embody them.

Having thus described our invention, we claim:

1. A sulfur retort comprising a closed casing formed in two complemental sections, one section being movable relative to the other section, a drive shaft journaled in the fixed casing section, a rotary cage formed of material capable of resisting decomposition that occurs in handling molten sulfur adapted to receive and support sulfur bearing material and carried by the movable casing section so as to telescope within the fixed casing section as the movable casing section is moved toward and away therefrom, and coöperating clutch members on the drive shaft and cage respectively and arranged to be automatically brought into and out of operative relation as the cage is telescoped in and out of the casing section.

2. A sulfur retort comprising a tubular casing having a closed end and an open end, a head movable toward and away from the casing and adapted to close the open end thereof, a frame carried by the head and arranged to telescope within the casing as the head is moved into and out of operative position, a shaft journaled upon the said frame and extending longitudinally of the casing, a rotatable cage formed of material capable of resisting decomposition that occurs in handling molten sulfur adapted to receive and support sulfur bearing material mounted upon the shaft, a drive shaft extending through and journaled within the closed end of the casing, and coöperating clutch members on the drive shaft and cage respectively and arranged to be automatically brought into and out of operative relation as the cage is telescoped in and out of the casing section.

3. A sulfur retort comprising a closed casing formed in complemental sections, one of the sections being movable with respect to the other section to open the casing, a drive shaft extending into the fixed casing section, a rotary cage carried by the movable casing section, a releasable driving connection between the drive shaft and the cage, means for moving the movable casing section, and locking means associated with the moving means to be automatically actuated thereby.

4. A sulfur retort comprising a tubular casing having an open end and a closed end, a head movable toward and away from the casing and adapted to close the open end thereof, tracks arranged within the casing, a frame carried by the head and mounted to telescope within the casing as the head is moved into and out of operative position, and supporting wheels carried by the frame and traveling upon the tracks, a shaft journaled upon the frame and extending longitudinally of the casing, a rotary cage formed of material capable of resisting decomposition that occurs in handling molten sulfur adapted to receive and support sulfur bearing material mounted upon the shaft, a drive shaft extending through the closed end of the casing, and coöperating clutch members on the drive shaft and shaft of the cage respectively and arranged to be automatically brought into and out of operative relation as the cage is telescoped in and out of the casing section.

5. A sulfur retort comprising a casing having an open end, a head adapted to close the said open end of the casing and movable toward and away from the same, means for moving the head, and latch means mounted upon the head and associated with the moving means to be automatically actuated thereby.

6. A sulfur retort comprising a casing having an open end, a head adapted to close the said open end of the casing and movable toward and away therefrom, a cross head arranged in a spaced relation to the head and movable in the same direction, means for moving the cross head, an operative connection between the cross head and the head which admits of a relative movement between the said members, and latch means upon the head constructed to be automatically actuated by the relative movement between the head and the cross head.

7. A sulfur retort comprising a casing having an open end, a head adapted to close the said casing and movable toward and away from the same, latch means upon the head for locking it in a close engagement with the casing, a cross head mounted back of the head and arranged to have a relative movement with respect thereto, means for positively moving the cross head, and a toggle connection between the cross head and the latch means whereby the latch means is automatically operated by the relative movement between the head and cross head.

8. A sulfur retort comprising a casing, track irons within the casing, a carriage movable on the track irons, a cage supported by the carriage, a shaft upon which the cage is mounted, driving means for said shaft, clutch mechanism for said shaft, and common actuating means for opening the casing, removing the cage, and disconnecting the clutch mechanism.

9. A sulfur retort comprising a casing, a receiving cage for sulfur rock, the cylindrical walls of which are made up of an annularly arranged series of rods or pipes, a central shaft for supporting the cage, driving means for rotating the supporting shaft and means for moving the cage endwise from the casing.

WILLIAM E. CLIFFORD.
THOMAS H. GREEN.